(12) United States Patent
Caverly et al.

(10) Patent No.: US 11,958,526 B2
(45) Date of Patent: Apr. 16, 2024

(54) STEERING COLUMN ENERGY ABSORPTION DISPLACEMENT LIMITER

(71) Applicant: Steering Solutions IP Holding Corporation, Saginaw, MI (US)

(72) Inventors: Jacob A. Caverly, Freeland, MI (US); James E. Rouleau, Burt, MI (US); Randy W. Jones, North Branch, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/102,961

(22) Filed: Jan. 30, 2023

(65) Prior Publication Data

US 2023/0242174 A1   Aug. 3, 2023

Related U.S. Application Data

(60) Provisional application No. 63/304,994, filed on Jan. 31, 2022.

(51) Int. Cl.
*B62D 1/185* (2006.01)
*B62D 1/181* (2006.01)
*B62D 1/19* (2006.01)

(52) U.S. Cl.
CPC ............. *B62D 1/185* (2013.01); *B62D 1/181* (2013.01); *B62D 1/19* (2013.01)

(58) Field of Classification Search
CPC .......... B62D 1/185; B62D 1/181; B62D 1/19; B62D 1/183; B62D 1/192; B62D 3/12
See application file for complete search history.

(56) References Cited

U.S. PATENT DOCUMENTS

| | | | | |
|---|---|---|---|---|
| 11,643,131 B2* | 5/2023 | Bayer | ............ | B62D 1/184 |
| | | | | 74/493 |
| 2018/0079443 A1* | 3/2018 | Anspaugh | ............ | B62D 1/185 |
| 2019/0047606 A1* | 2/2019 | Dite | ............ | B62D 1/195 |
| 2022/0266890 A1* | 8/2022 | Buzzard | ............ | B62D 1/195 |
| 2023/0192173 A1* | 6/2023 | Tinnin | ............ | B62D 1/19 |
| | | | | 280/777 |

FOREIGN PATENT DOCUMENTS

| | | | |
|---|---|---|---|
| CN | 115427287 A * | 12/2022 | ............ B62D 1/185 |
| DE | 102016202465 A1 | 8/2017 | |
| DE | 102019205861 A1 | 10/2020 | |
| DE | 102021202071 A1 | 9/2022 | |
| WO | 2018055355 A1 | 3/2018 | |

OTHER PUBLICATIONS

Office Action regarding corresponding DE App. No. 10 2023 102 014.5; issued Sep. 25, 2023.

* cited by examiner

*Primary Examiner* — Drew J Brown
(74) *Attorney, Agent, or Firm* — Dickinson Wright PLLC

(57) ABSTRACT

A steering column assembly includes a telescope drive bracket. The steering column assembly also includes a first jacket operatively coupled to the telescope drive bracket. The steering column assembly further includes a second jacket, wherein the first jacket is telescopingly moveable relative to the second jacket. The steering column yet further includes a collapse limiting feature having a cam portion and a blocking portion, wherein the blocking portion defines a first range of travel of the first jacket in a first position, wherein contact between the telescope drive bracket and the cam portion biases the blocking portion out of a first jacket path to allow a second, greater range of travel for the first jacket.

18 Claims, 12 Drawing Sheets

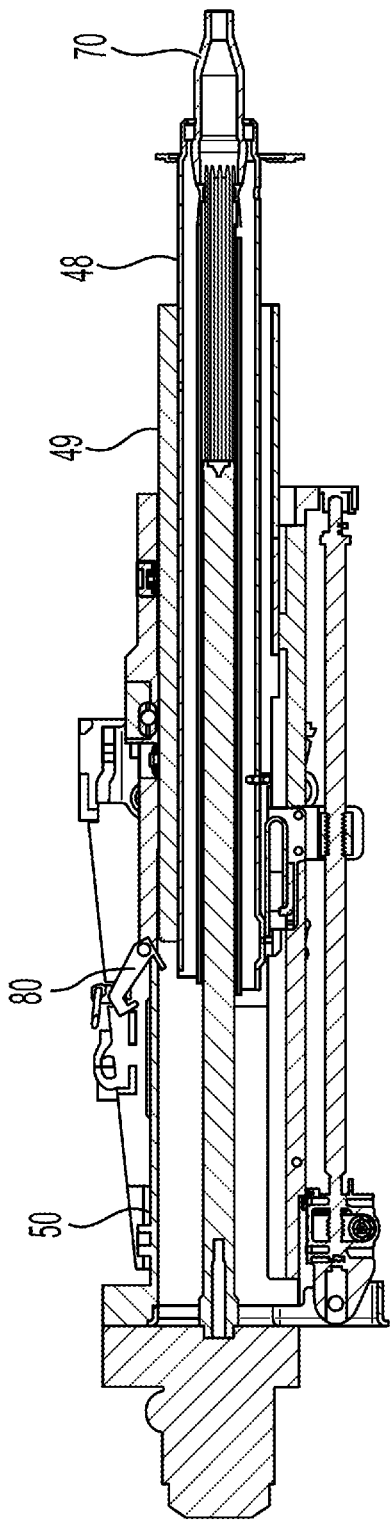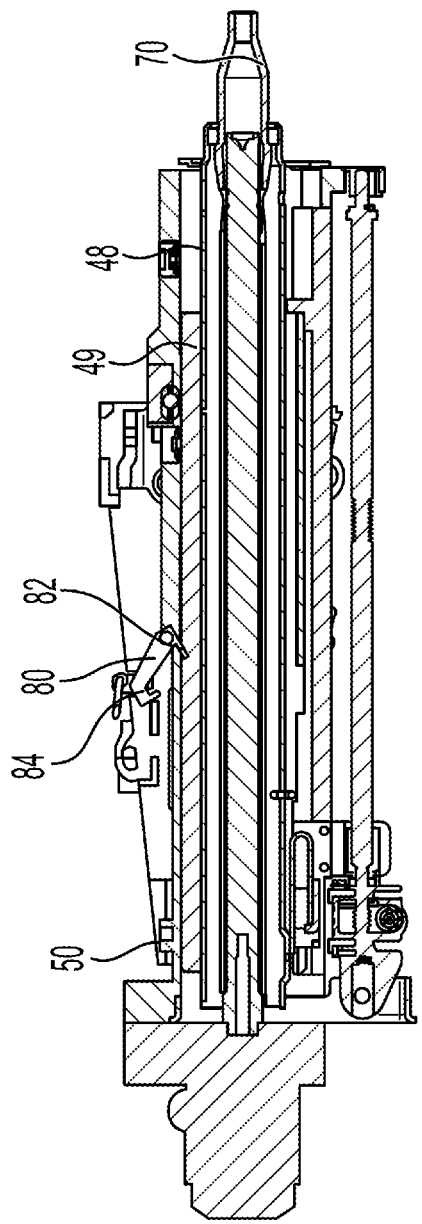

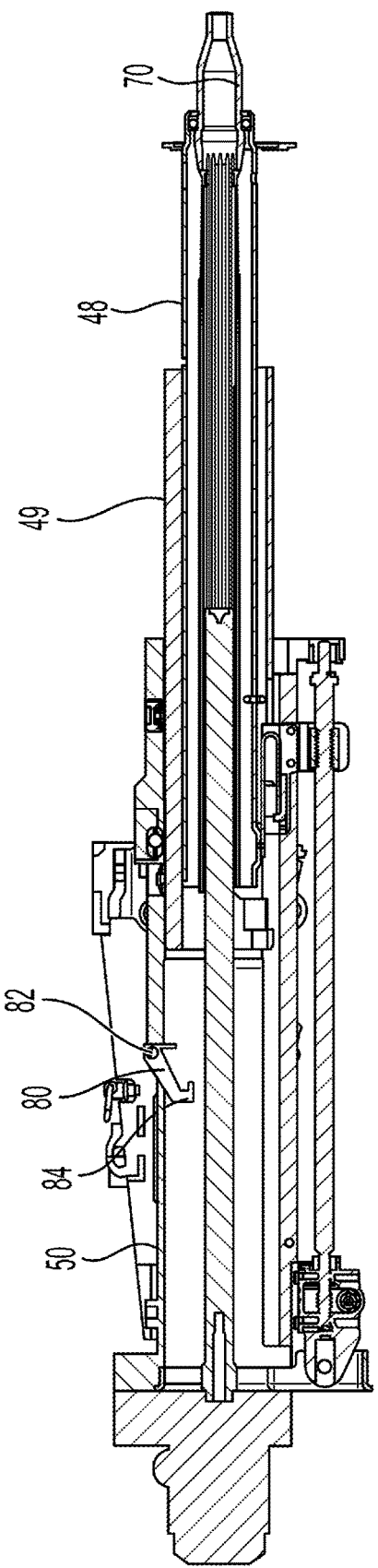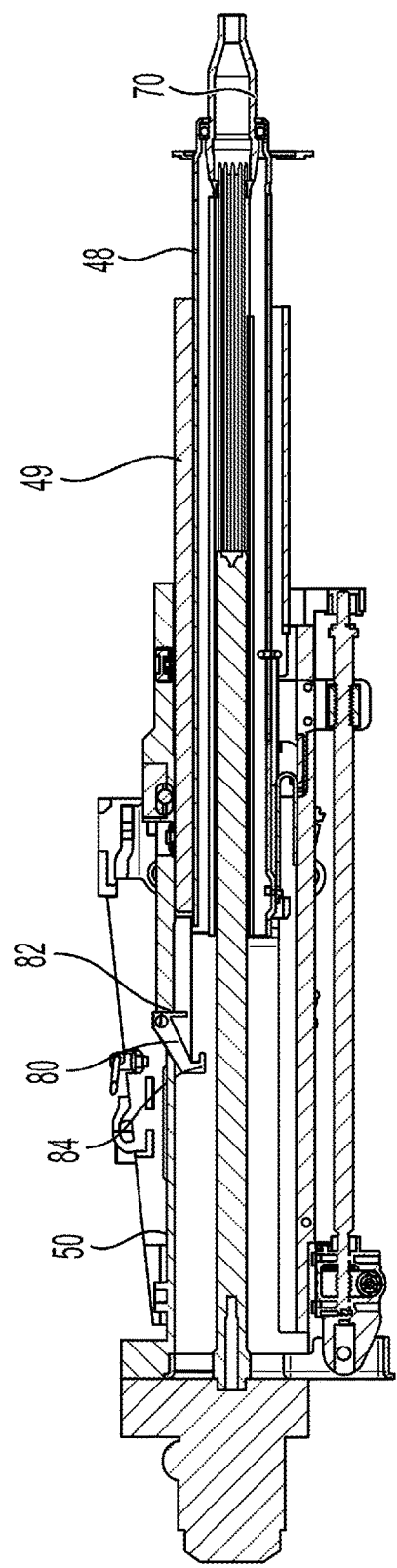

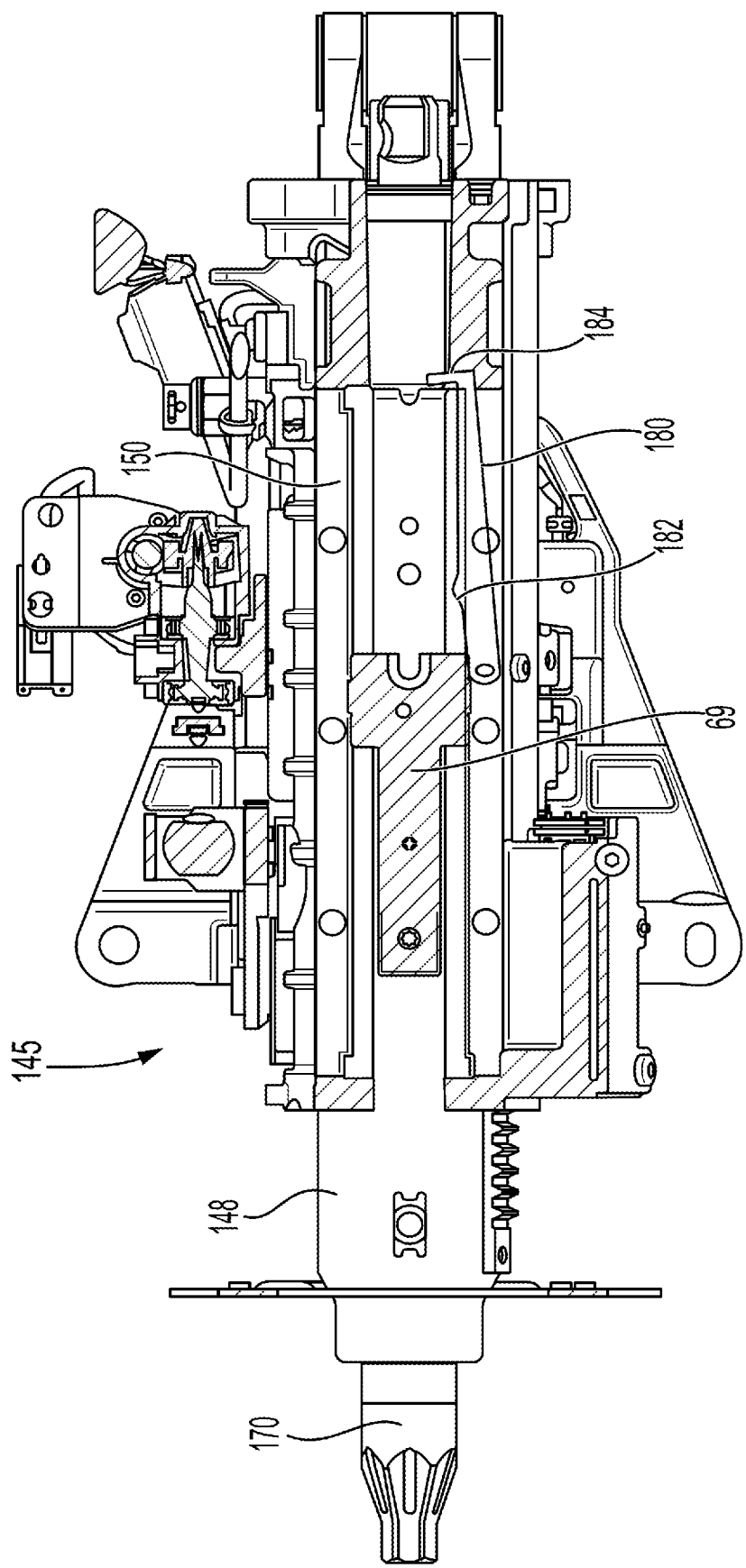

STEERING COLUMN ENERGY ABSORPTION DISPLACEMENT LIMITER

CROSS-REFERENCE TO RELATED APPLICATION

This application claims the benefits of priority to U.S. Provisional Patent Application Ser. No. 63/304,994, filed Jan. 31, 2022, the disclosure of which is incorporated by reference herein in its entirety.

FIELD OF THE INVENTION

The embodiments described herein relate to vehicle steering systems and, more particularly, to a steering column energy absorption displacement limiter.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions. In the past, a function of axially adjustable steering columns was to provide flexibility in the location of the hand wheel and facilitate more comfortable driving positions for different sizes of drivers. However, now there are opportunities for significantly more telescopic travel, which also may be referred to as stow travel (i.e., when the hand wheel is not needed). For example, the hand wheel could be repositioned further away from the driver to allow him or her to do things other than operate the vehicle, such as work on a laptop computer when the vehicle is parked. Other examples include vehicles with autonomous driving capability, such that the hand wheel could be stowed when the vehicle is in an autonomous driving mode.

Some steering columns are required to have a limitation of the overall energy absorption axial displacement distance (also referred to herein as "stroke distance") to a defined displacement. This is typically done with a fixed geometry in a steering column, such as a fixed cast feature that stops motion of the upper jacket, for example. There is additional complexity when dealing with steering columns that are "stowable". The available steering column jacket stow/telescope stroke is much greater when compared to a desired energy absorption stroke distance. Traditional, non-stowable, steering columns have energy absorption stroke that is greater than the telescope stroke of the steering columns. The jacket must be able to stroke through the energy absorption stroke zone during normal stow functioning, but a fixed limiter feature is challenging to implement.

Prior stowable columns requiring a limitation of energy absorption stroke used a pyrotechnic pin-extension device which extended a motion-limiting pin into the path of the stroking upper jacket in an energy absorption event. Pyrotechnic devices are specialized and require interaction with the vehicle to place the column in the energy absorption mode/configuration. Pyrotechnic devices have specialized transport considerations, require monitoring and special warehousing and are costly.

SUMMARY

According to one aspect of the disclosure, a steering column assembly includes a telescope drive bracket. The steering column assembly also includes a first jacket operatively coupled to the telescope drive bracket. The steering column assembly further includes a second jacket, wherein the first jacket is telescopingly moveable relative to the second jacket. The steering column yet further includes a collapse limiting feature having a cam portion and a blocking portion, wherein the blocking portion defines a first range of travel of the first jacket in a first position, wherein contact between the telescope drive bracket and the cam portion biases the blocking portion out of a first jacket path to allow a second, greater range of travel for the first jacket.

According to another aspect of the disclosure, a steering column assembly includes a first jacket. The steering column assembly also includes a second jacket. The steering column assembly further includes a third jacket, wherein the first jacket and the third jacket are telescopingly moveable relative to each other and to the second jacket. The steering column assembly yet further includes a collapse limiting feature having a cam portion and a blocking portion, wherein the blocking portion defines a first range of travel of the first jacket in a first position, wherein contact between the third jacket and the cam portion biases the blocking portion out of a first jacket path to allow a second, greater range of travel for the first jacket.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 3A-3D illustrate a series of positions of the steering column assembly of FIG. 2 during movement in a stowing mode;

FIGS. 4A-4C illustrate a series of positions of the steering column assembly of FIG. 2 during movement in an energy absorption mode;

FIGS. 7A and 7B illustrate a series of positions of the steering column assembly of FIG. 5 during movement in an energy absorption mode.

DETAILED DESCRIPTION

Figure 1:
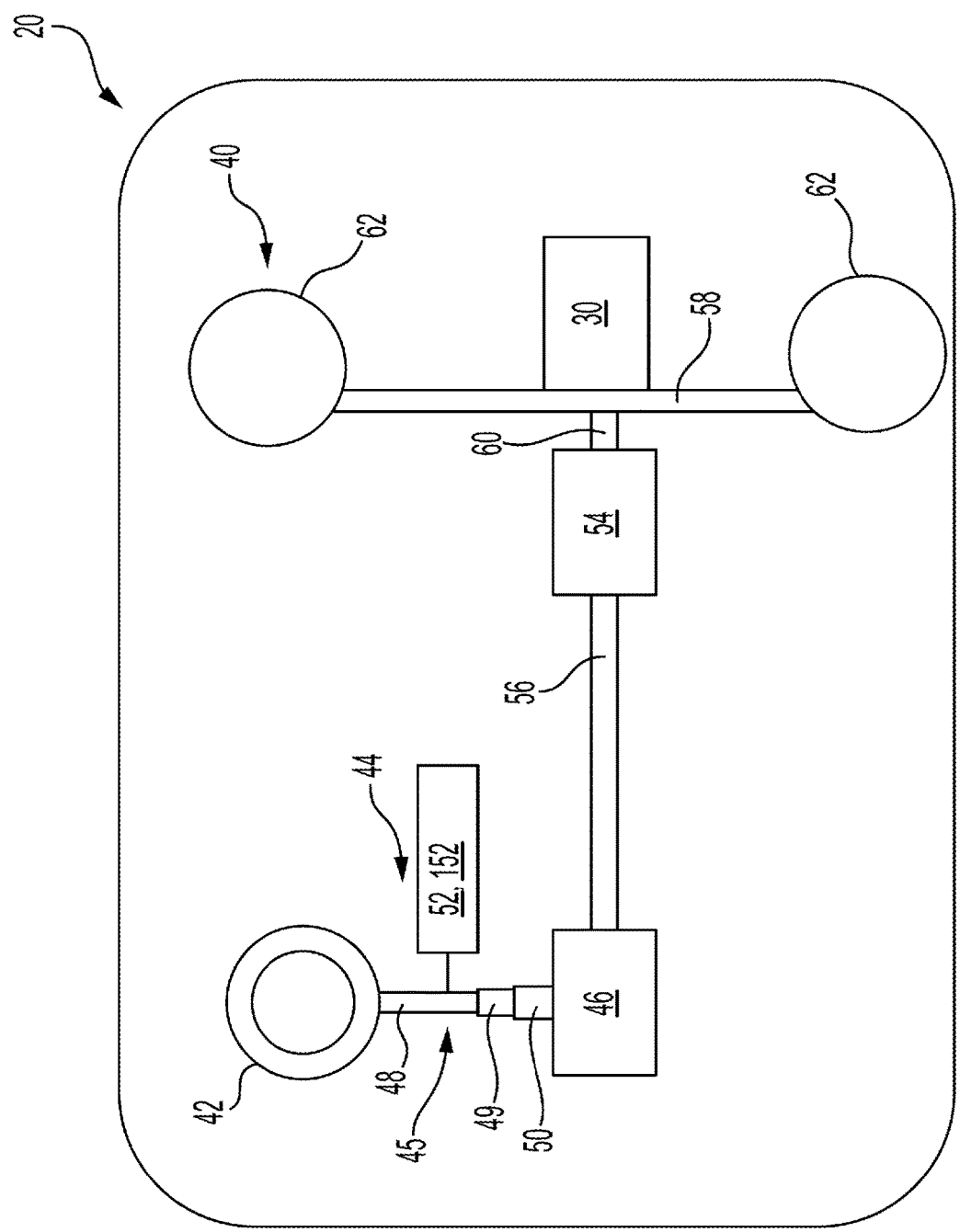
FIG. 1 generally illustrates a vehicle with a steering system according to the principles of the present disclosure.

The following discussion is directed to various embodiments of the disclosure. Although one or more of these embodiments may be discussed and/or illustrated in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be illustrative of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for transferring steering input to an output that interacts with a steering linkage to ultimately cause the vehicle wheels (or other elements) to turn the vehicle. Some steering columns are axially adjustable between positions. In the past, a function of axially adjustable steering columns was to provide flexibility in the location of the hand wheel and facilitate more comfortable driving positions for different sizes of drivers. However, now there are opportunities for significantly more telescopic travel, which also may be referred to as stow travel (i.e., when the hand wheel is not needed). For example, the hand wheel could be repositioned completely away from the driver to allow him or her to do things other than operate the vehicle, such as work on a laptop computer when the vehicle is parked. Other examples include vehicles with autonomous driving capability, such that the hand wheel could be stowed when the vehicle is in an autonomous driving mode.

Referring now to the drawings, where the various embodiments are shown and described herein, without limiting same, embodiments of an axially adjustable steering column assembly which accommodates an energy absorption assembly is shown. The axial adjustability can result from relative movement between two or more steering column portions (e.g., jackets, brackets, rails, and/or the like) that permit axial movement there between. For example, a first portion and a second portion (and possibly a third portion) that adjust in a relative telescopic, sliding, or translational movements.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other suitable vehicles. The vehicle 20 may include a propulsion system 30, such as an ignition system, an electronic system, or combinations thereof.

In some embodiments, the vehicle 20 may further include a steering system 40. The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. A steering column assembly 44 includes a steering column 45 that extends along an axis from the input device 42 to an output assembly 46. The output assembly 46 may include a pinion shaft assembly, an I-shaft, a cardan joint, steer-by-wire components or any feature conventionally located opposite the input device 42.

The steering column 45 may include at least two axially adjustable portions, for example, an upper jacket 48 and a lower jacket 50 that are axially adjustable with respect to one another. The at least two axially adjustable portions may further include at least one middle jacket 49 that is disposed between the upper jacket 48 and the lower jacket 50. The axial movement may include sliding, telescopic, translating, other axial movements, or combinations thereof. The steering column assembly 44 may include a component, such as a mounting bracket, a power assist housing, an output assembly, a steering gear assembly, a body structure, and/or another component other than the jackets 48, 49, 50. An axial actuator assembly 52 may be provided to actuate axial adjustment of the upper jacket 48, and in some embodiments the middle jacket 49, relative to the lower jacket 50.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 is operably connected to the steering gear assembly 54 such that a rotation of the steering gear input shaft 56 causes a responsive movement of the output shaft 60 and causes the drive axle to turn wheels 62.

Figure 2:
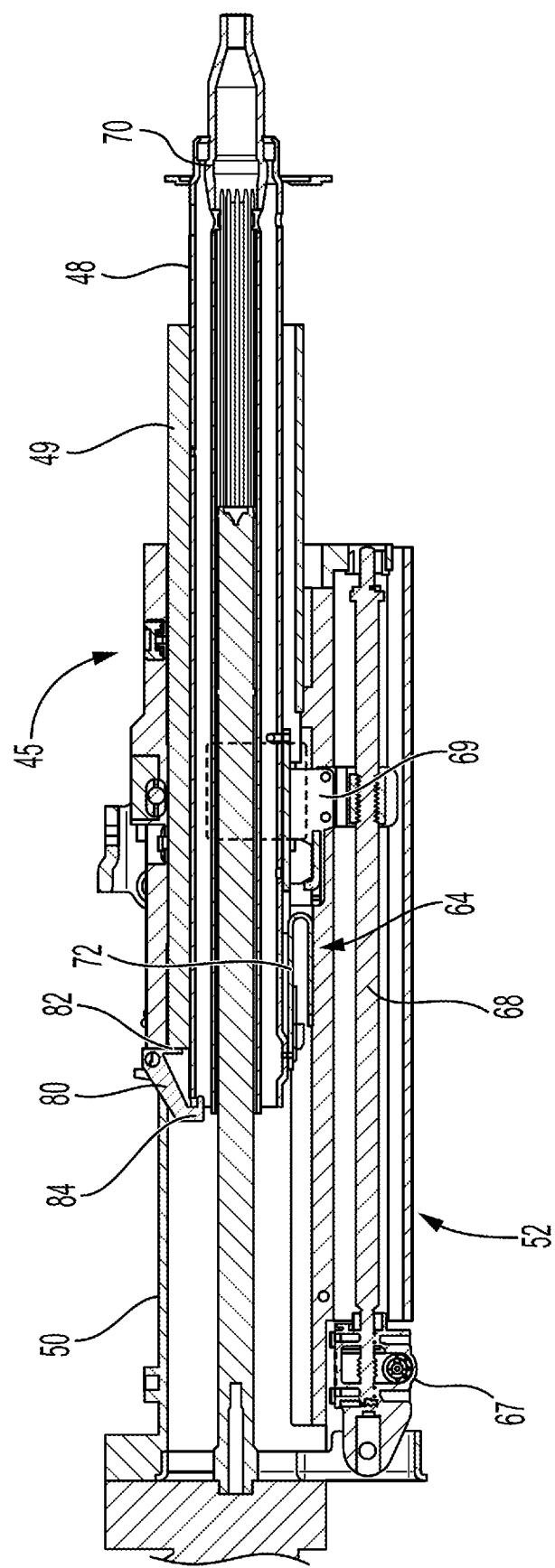
FIG. 2 is a steering column assembly according to an embodiment having three or more jackets.

Referring now to FIG. 2, a "three jacket" embodiment of the steering column 45 is illustrated in greater detail. In particular, the steering column 45 includes the upper jacket 48, the middle jacket 49 and the lower jacket 50. A steering shaft 70 is positioned within the upper jacket 50 and may have the steering input device 42 connected to an end thereof. As described herein, the upper jacket 48 is axially adjustable relative to the middle jacket 49 and the lower jacket 50. The middle jacket 49 is also axially adjustable relative to the lower jacket 50. The axial adjustability permits movement over a normal manual driving mode axial range (may be referred to as a "comfort range"). Over the comfort range, energy absorption with an energy absorption system 64 is desired and operational. The axial adjustability also permits movement away from an extended position of the steering column 45 to a retracted range of positions that may be referred to as a "stowed" range of positions. In some embodiments, the middle jacket 49 and the upper jacket 48 are retractable to an extent that positions each of these jackets 48, 49 fully—or substantially fully—within the lower jacket 50 (i.e., flush). For example, it may be beneficial to place the input device 42 in a stowed location during autonomous driving.

In operation, the axial actuator assembly 52 effectuates axial movement between the upper jacket 48, the middle jacket 49, and the lower jacket 50 to adjust between the extended position, the retracted position, and any intermediary positions. The axial actuator assembly 52 includes a motor 67 operatively coupled to a lead screw 68 to drive rotation of the lead screw 68. A telescope drive bracket 69 having a nut feature is in threaded engagement with an outer surface of the lead screw 68, such that rotation of the lead screw 68 results in axial movement of the telescope drive bracket 69 along the lead screw 68. The telescope drive bracket 69 is operatively coupled to the upper jacket 48 to axially drive the upper jacket 48 relative to the lower jacket 50. The coupled relationship of the upper jacket 48 and the middle jacket 49 provides axial movement of the middle jacket 49 as well. Operative coupling of the upper jacket 48 and the telescope drive bracket 69 may be made directly or indirectly. In one example, one or more mechanical fasteners (e.g., bolts) may couple the telescope drive bracket 69 to the upper jacket 48. In another non-limiting example, the telescope drive bracket 69 may be operatively coupled to the upper jacket 48 with a friction clamp or the like. The preceding examples are merely illustrative and other coupling assemblies are contemplated.

The energy absorption system 64 is coupled to the upper jacket 48 and axially translates with the upper jacket 48 during normal axial movement of the upper jacket 48. However, during an impact event where energy absorption is beneficial, the energy absorption system 64 unrolls an energy absorption strap 72 to absorb impact energy as the upper jacket 48 rapidly moves from the extended position toward the retracted position. Energy absorption with the energy absorption system 64 is beneficial when the upper jacket 48 is in the comfort range, but only a certain range of collapse/travel of the upper jacket 48 during an impact event is desired. The embodiments disclosed herein limit the collapse movement, but permit a full range of axial travel for stowing the steering column 45.

As shown, a collapse limiter feature 80 is operatively coupled to the lower jacket 50, but it is contemplated that the collapse limiter feature 80 is operatively coupled to another structure. The collapse limiter feature 80 is shown as a mechanical hook that is pivotable about an axis where the collapse limiter feature 80 is coupled to the lower jacket 50, but it is to be understood that other mechanical features with different geometries may be utilized. The collapse limiter feature 80 is disposed in the path of the upper jacket 48 to arrest motion of the upper jacket 48 after energy absorption stroke during an impact event, but allows stowing of the overall steering column during normal telescoping/stowing operation via telescoping movement of the upper jacket 48 and the middle jacket 49. Therefore, the collapse limiter feature 80 provides a bi-modal assembly that operates dependent upon the operational state of steering column 45. Specifically, one operational state is enabled during stow/telescope function and a separate operational state is enabled during an energy absorption function.

For pivotable embodiments of the collapse limiting feature 80, a torsion spring is in contact with the collapse limiting feature 80 to rotationally bias the collapse limiting feature 80 into the first jacket path. For at least partially translatable embodiments of the collapse limiting feature 80, other types of springs capable of linear biasing is in contact with the collapse limiting feature 80 to bias the collapse limiting feature 80 into the first jacket path.

Figure 3A:
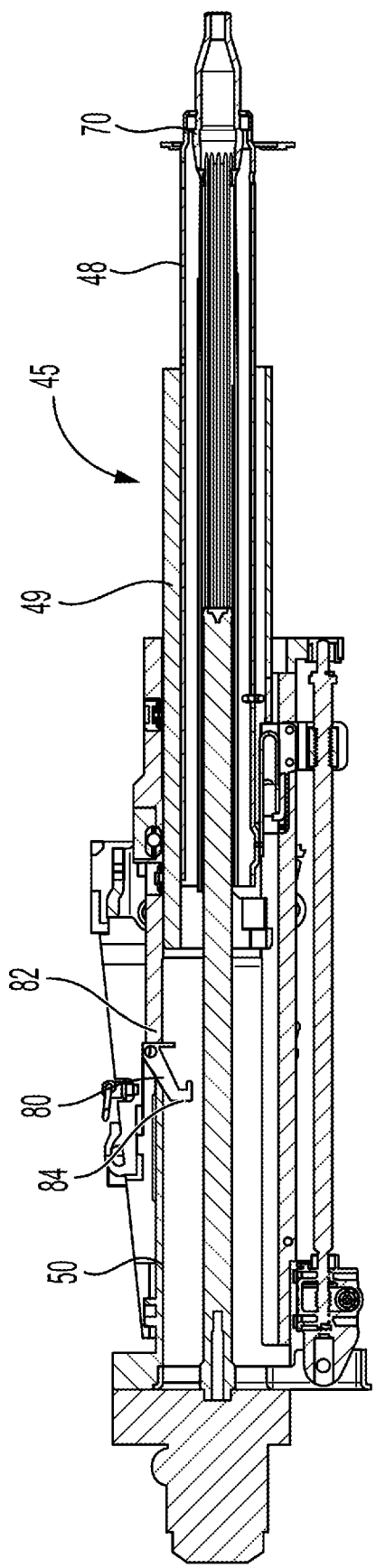
Figure 3B:
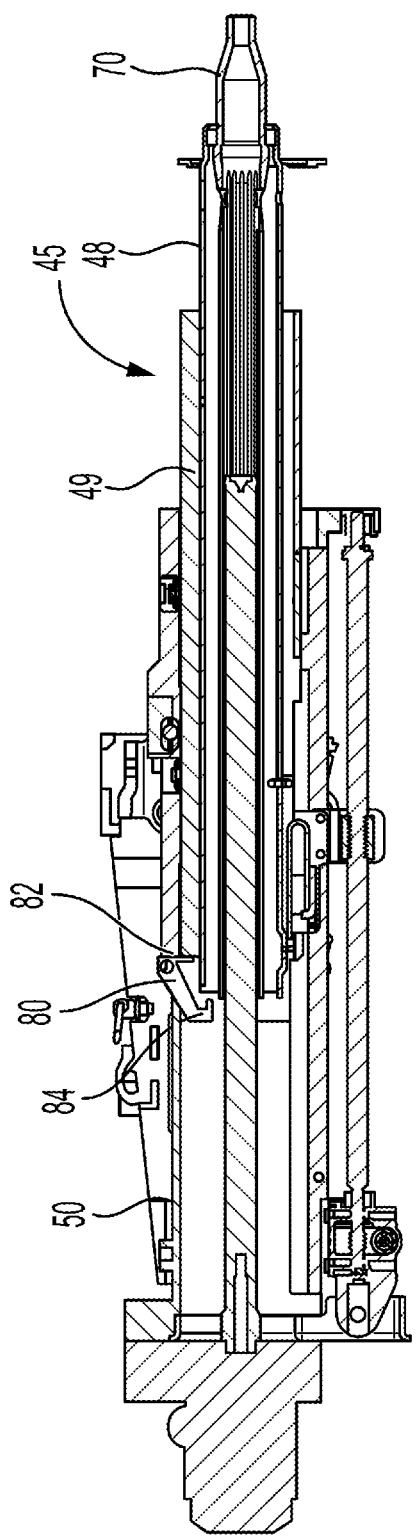

FIGS. 3A-3D illustrate movement of the steering column 45 during the telescope/stowing mode. In particular, upon movement from an extended position (FIG. 3A) of the steering column 45, the middle jacket 49 contacts a cam portion 82 of the collapse limiter feature 80, thereby rotating the collapse limiter feature 80 to a position that does not impede further telescoping movement of the upper jacket 48 (FIGS. 3B and 3C). Therefore, the upper jacket 48 and the middle jacket 49 are free to telescope to a fully stowed position (FIG. 3D). While rotation of the collapse limiter feature 80 is shown, it is to be appreciated that the cam portion 82 may be a ramp that results in translation of the collapse limiter feature 80 or a combination of translation and rotation.

Figure 4C:
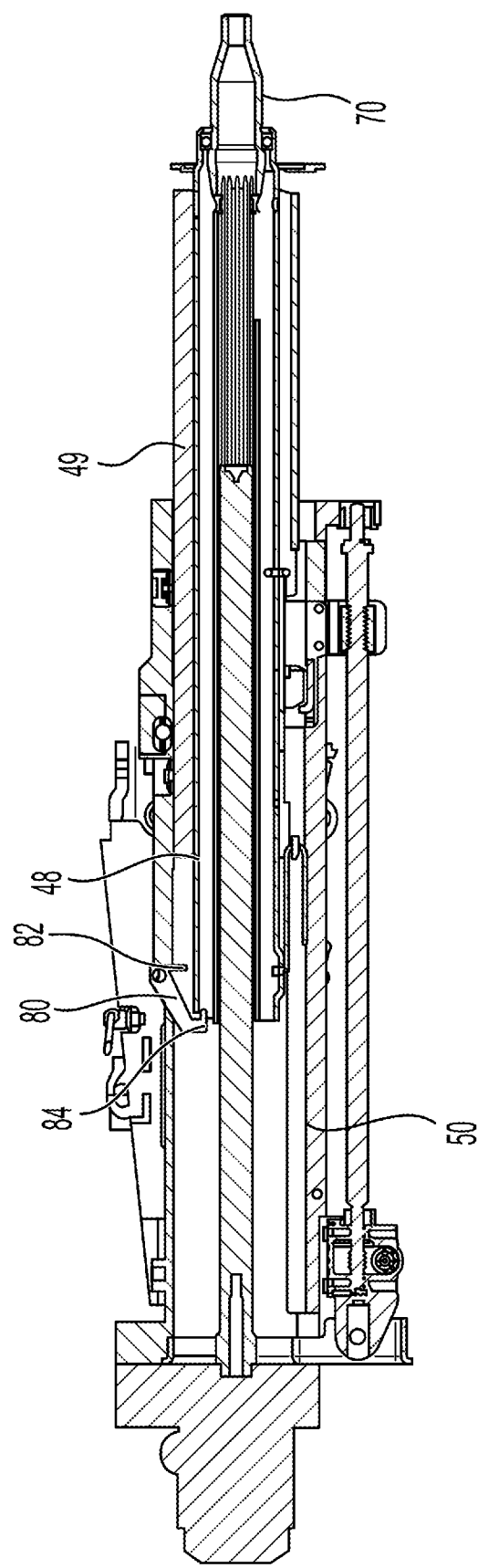

FIGS. 4A-4C illustrate movement of the steering column 45 during the energy absorption mode. In particular, upon movement from an extended position (FIG. 4A) of the steering column, the upper jacket 48 mechanically decouples from the telescope drive bracket 69 and moves relative to the stationary middle jacket 49 (FIG. 4B). Decoupling of the upper jacket 48 from the telescope drive bracket 69 occurs due to a sufficient force being imparted on the upper jacket 48 relative to the telescope drive bracket 69. Decoupling may occur due to shearing of a bolted connection (or other mechanical fastener) between the two components in some embodiments. Other embodiments may require the telescope drive bracket 69 sliding relative to a friction clamp or the like. As discussed above, other coupling assemblies of the upper jacket 48 and the telescope drive bracket 69 are contemplated and fully within the scope of the embodiments disclosed herein. Such alternative couplings would entail alternative decoupling processes, but do not limit the disclosure. Without contact between the middle jacket 49 and the cam portion 82 of the collapse limiter feature 80 to bias the collapse limiter feature 80 out of the path of the upper jacket 48, the upper jacket 48 is blocked by a hook 84 (or other obstruction generally referenced as a "blocking portion") of the collapse limiter feature 80 to define a displacement limit during an impact event (FIG. 4C).

Figure 5:
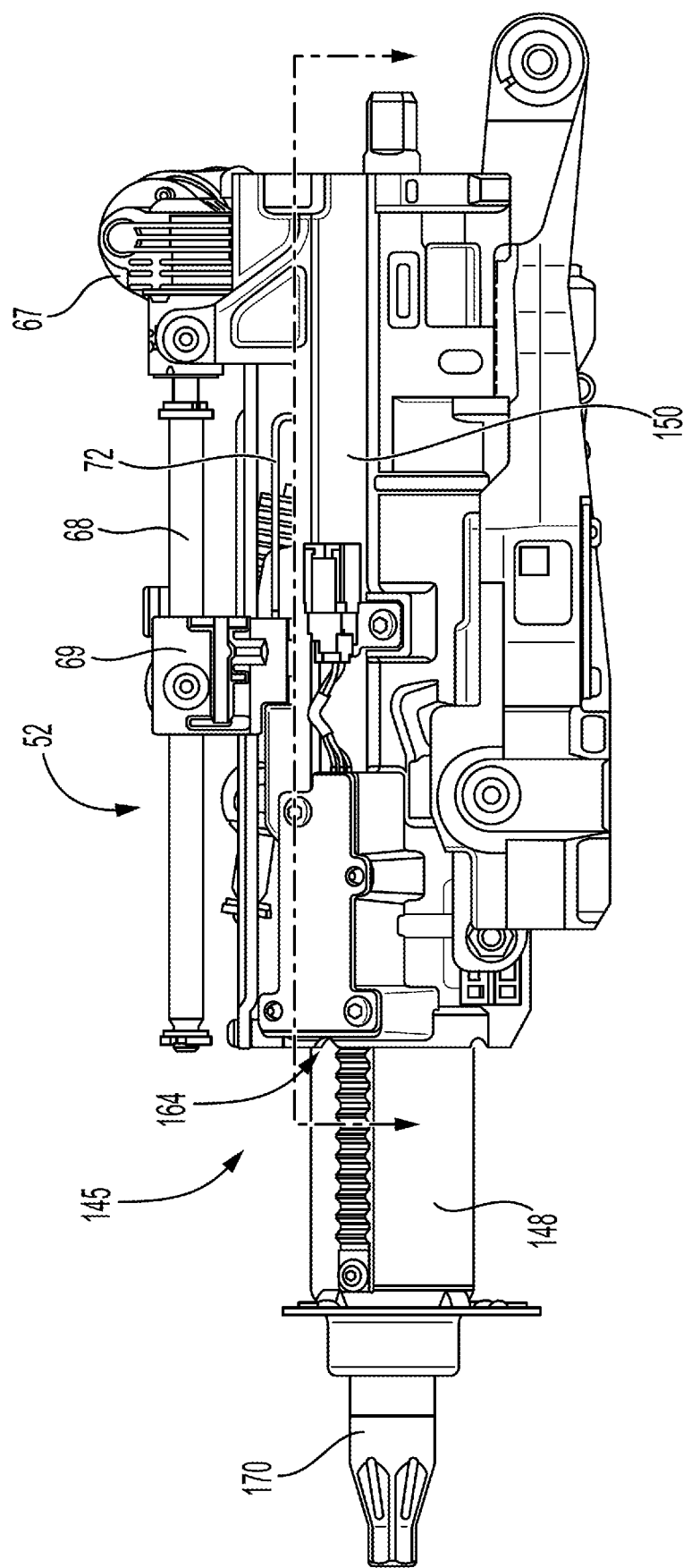
FIG. 5 is an elevation view of a steering column assembly according to an embodiment having two jackets.

Referring now to FIG. 5, a "two jacket" embodiment of the steering column is illustrated in greater detail and is referred to with numeral 145. In particular, the steering column 145 includes an upper jacket 148 and a lower jacket 150. A steering shaft 170 is positioned within the upper jacket 150 and may have the steering input device 42 connected to an end thereof. As described herein, the upper jacket 148 is axially adjustable relative to the lower jacket 150. The axial adjustability permits movement over a normal manual driving mode axial range (may be referred to as a "comfort range"). Over the comfort range, energy absorption with an energy absorption system 164 is desired and operational. The axial adjustability also permits movement away from an extended position of the steering column 145 to a retracted range of positions that may be referred to as a "stowed" range of positions. In some embodiments, the upper jacket 148 is retractable to an extent that the position of the upper jacket 148 is fully—or substantially fully—within the lower jacket 150 (i.e., flush). For example, it may be beneficial to place the input device 42 in a stowed location during autonomous driving.

In operation, the axial actuator assembly 52 effectuates axial movement between the upper jacket 148 and the lower jacket 150 to adjust between the extended position, the retracted position, and any intermediary positions. As described in connection with the "three jacket embodiment", the axial actuator assembly 52 includes a motor 67 operatively coupled to a lead screw 68 to drive rotation of the lead screw 68. A telescope drive bracket 69 having a nut feature is in threaded engagement with an outer surface of the lead screw 68, such that rotation of the lead screw 68 results in axial movement of the telescope drive bracket 69 along the lead screw 68. The telescope drive bracket 69 is operatively coupled to the upper jacket 148 to axially drive the upper jacket 148 relative to the lower jacket 150. Operative coupling of the upper jacket 148 and the telescope drive bracket 69 may be made directly or indirectly. In one example, one or more mechanical fasteners (e.g., bolts) may couple the telescope drive bracket 69 to the upper jacket 148. In another non-limiting example, the telescope drive bracket 69 may be operatively coupled to the upper jacket 148 with a friction clamp or the like. The preceding examples are merely illustrative and other coupling assemblies are contemplated.

As also described in connection with the "three jacket" embodiment, the energy absorption system 64 is coupled to the upper jacket 148 and axially translates with the upper jacket 148 during normal axial movement of the upper jacket 148. However, during an impact event where energy absorption is beneficial, the energy absorption system 64 unrolls an energy absorption strap 72 to absorb impact energy as the upper jacket 148 rapidly moves from the extended position toward the retracted position. Energy absorption with the energy absorption system 64 is beneficial when the upper jacket 148 is in the comfort range, but only a certain range of collapse/travel of the upper jacket 148 during an impact event is desired. The embodiments disclosed herein limit the collapse movement, but permit a full range of axial travel for stowing the steering column 145.

Figure 6A:
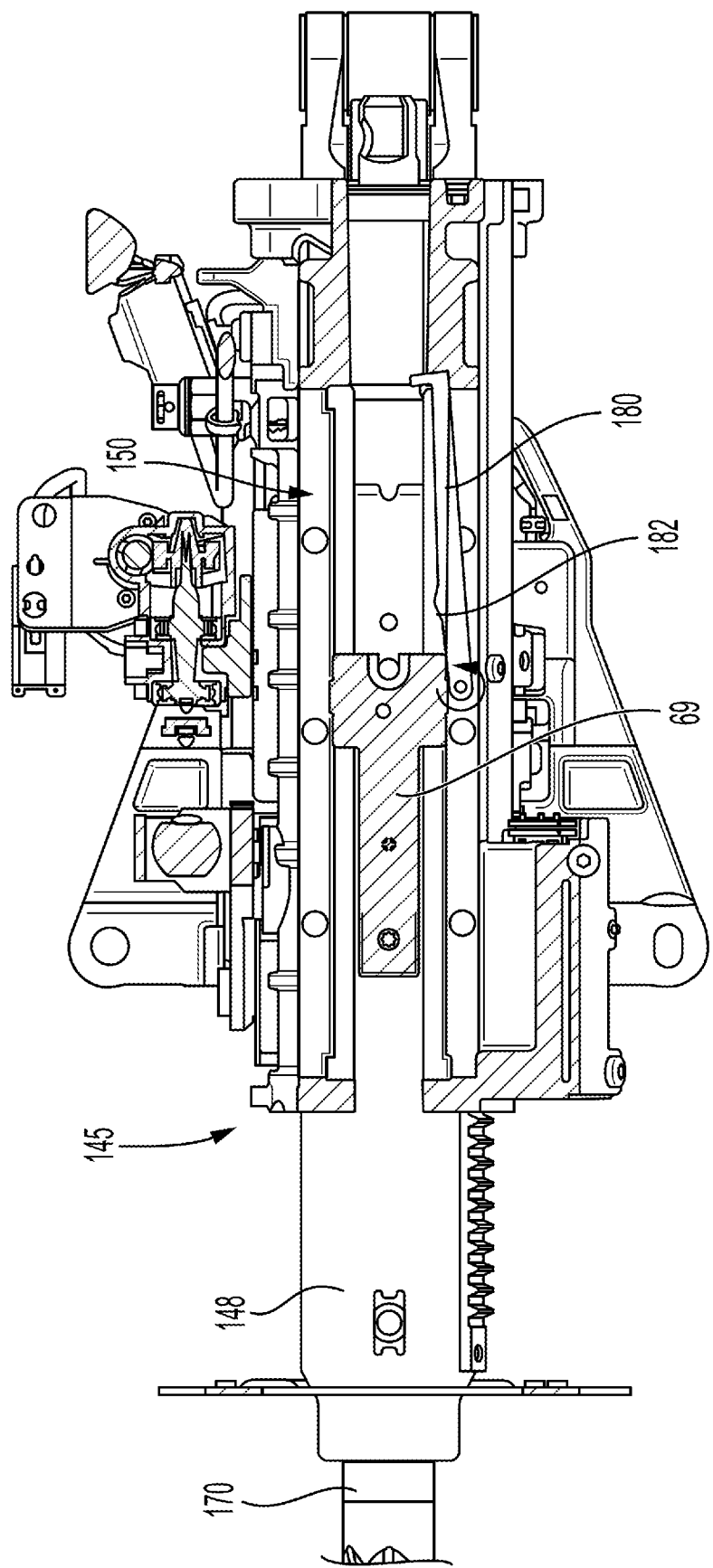
FIGS. 6A-6C illustrate a series of positions of the steering column assembly of FIG. 5 during movement in a stowing mode.
Figure 6B:
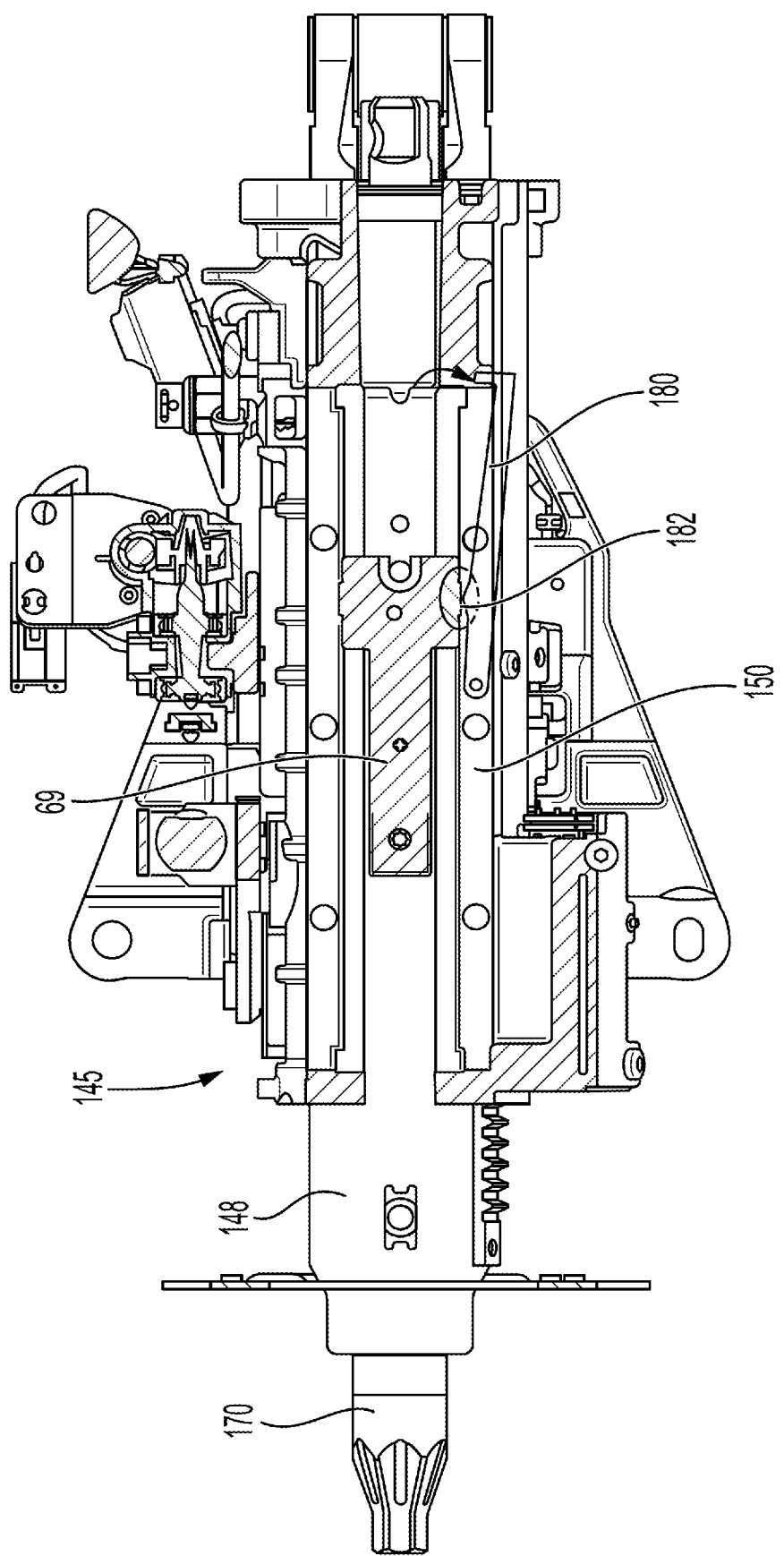
Figure 6C:
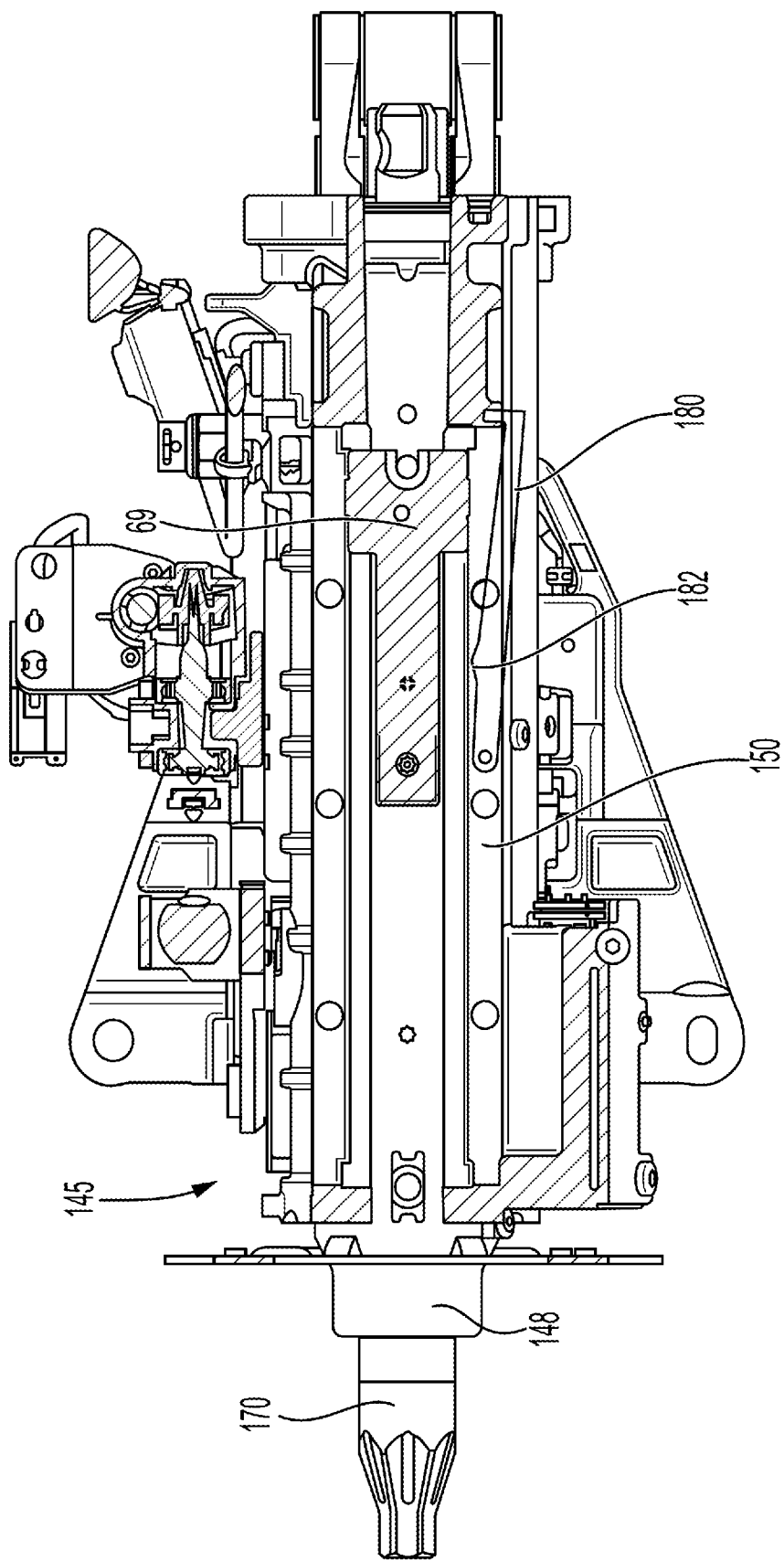

Referring now to FIGS. 6A-6C, a collapse limiter feature 180 is operatively coupled to the lower jacket 150, but it is contemplated that the collapse limiter feature 180 is operatively coupled to another structure. The collapse limiter feature 180 is shown as a mechanical hook that is pivotable about an axis where the collapse limiter feature 180 is coupled to the lower jacket 150, but it is to be understood that other mechanical features with different geometries may be utilized. The collapse limiter feature 180 is disposed in the path of the upper jacket 148 to arrest motion of the upper jacket 148 after energy absorption stroke during an impact event, but allows stowing of the overall steering column during normal telescoping/stowing operation via telescoping movement of the upper jacket 148. Therefore, the collapse limiter feature 180 provides a bi-modal assembly that operates dependent upon the operational state of steering column 145. Specifically, one operational state is enabled during stow/telescope function and a separate operational state is enabled during an energy absorption function.

For pivotable embodiments of the collapse limiting feature 180, a torsion spring is in contact with the collapse limiting feature 180 to rotationally bias the collapse limiting feature 180 into the first jacket path. For at least partially translatable embodiments of the collapse limiting feature 180, other types of springs capable of linear biasing is in contact with the collapse limiting feature 180 to bias the collapse limiting feature 180 into the first jacket path.

FIGS. 6A-6C illustrate movement of the steering column 145 during the telescope/stowing mode. In particular, upon movement from an extended position (FIG. 6A) of the steering column 145, the telescope drive bracket 69 contacts a cam portion 182 of the collapse limiter feature 180, thereby rotating the collapse limiter feature 180 to a position that does not impede further telescoping movement of the upper jacket 148 (FIG. 6B). Therefore, the upper jacket 148 is free to telescope to a fully stowed position (FIG. 6C). While rotation of the collapse limiter feature 80 is shown, it is to be appreciated that the cam portion 82 may be a ramp that results in translation of the collapse limiter feature 80 or a combination of translation and rotation.

Figure 7A:
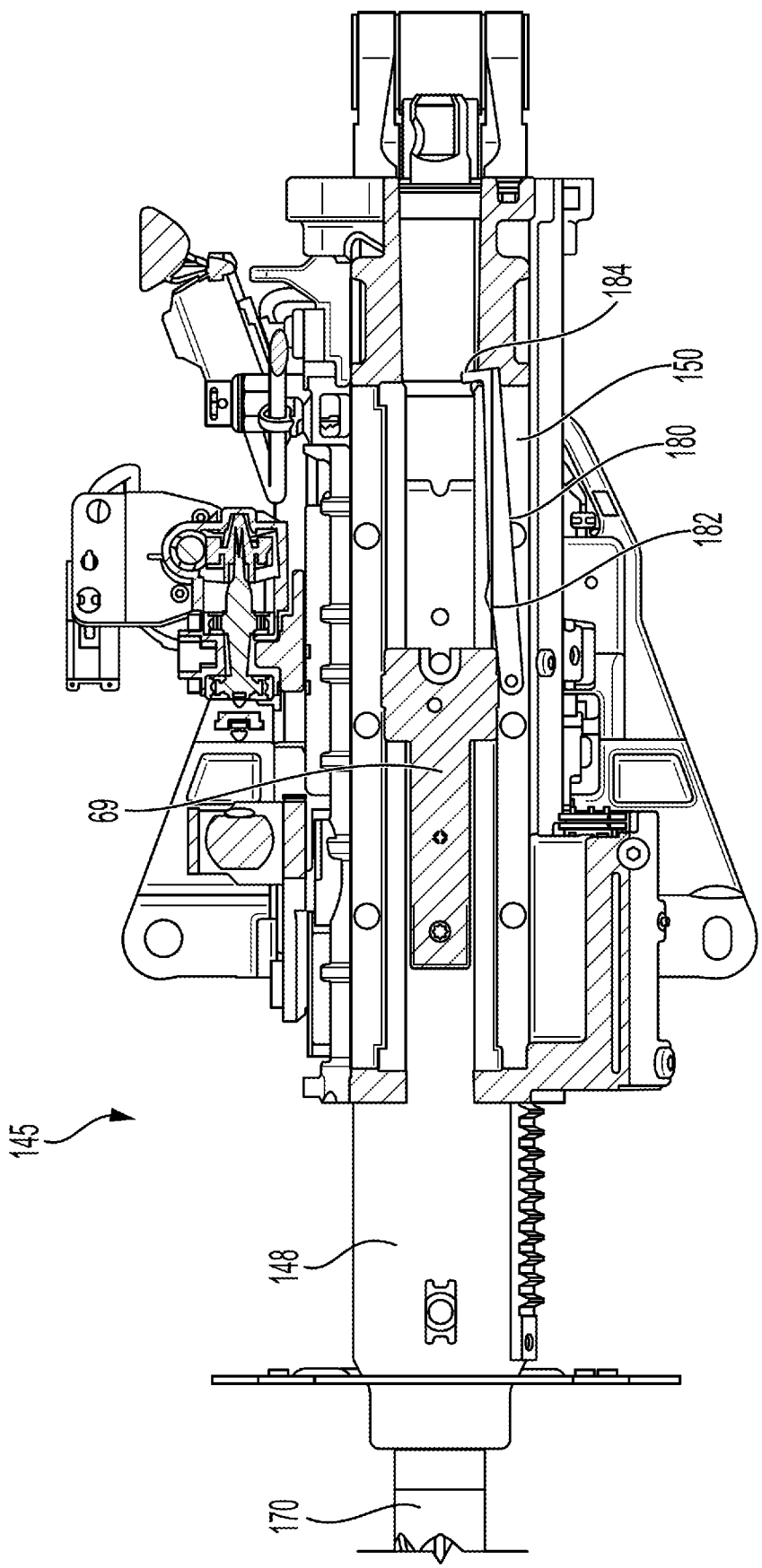

FIGS. 7A and 7B illustrate movement of the two jacket embodiment of the steering column 145 during the energy absorption mode. In particular, upon movement from an extended position (FIG. 7A) of the steering column 145, the upper jacket 148 mechanically decouples from the telescope drive bracket 69 and strokes independent of the telescope drive bracket 69. Decoupling of the upper jacket 48 from the telescope drive bracket 69 occurs due to a sufficient force being imparted on the upper jacket 148 relative to the telescope drive bracket 69. Decoupling may occur due to shearing of a bolted connection (or other mechanical fastener) between the two components in some embodiments. Other embodiments may require the telescope drive bracket 69 sliding relative to a friction clamp or the like. As discussed above, other coupling assemblies of the upper jacket 148 and the telescope drive bracket 69 are contemplated and fully within the scope of the embodiments disclosed herein. Such alternative couplings would entail alternative decoupling processes, but do not limit the disclosure. Without contact between the telescope drive bracket 69 and the cam portion 182 of the collapse limiter feature 180 to bias the collapse limiter feature 180 out of the path of the upper jacket 148, the upper jacket 148 is blocked by a hook 184 (or other obstruction generally referenced as a "blocking portion") of the collapse limiter feature 180 to define a displacement limit (FIG. 7B).

The embodiments disclosed herein provide a device 80, 180 for arresting the energy absorption motion of the steering column 45, 145 once a prescribed stroke distance has been achieved. The device 80, 180 is mechanically actuated into engagement and disengagement by the movement of the telescope/stow components. The device provides for unimpeded stow/telescope actuation under normal operational conditions, but provides an impedance for travel and an arresting of motion once the energy absorption function of the column is engaged and depleted.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

What is claimed is:

1. A steering column assembly comprising:
   a telescope drive bracket;
   a first jacket operatively coupled to the telescope drive bracket;
   a second jacket, wherein the first jacket is telescopingly moveable relative to the second jacket; and
   a collapse limiting feature having a cam portion and a blocking portion, wherein the blocking portion defines a first range of travel of the first jacket in a first position, wherein contact between the telescope drive bracket and the cam portion biases the blocking portion out of a first jacket path to allow a second, greater range of travel for the first jacket.

2. The steering column assembly of claim 1, wherein the collapse limiting feature is pivotably coupled to the second jacket.

3. The steering column assembly of claim 2, further comprising a torsion spring in contact with the collapse limiting feature to bias the collapse limiting feature into the first jacket path.

4. The steering column assembly of claim 1, wherein the collapse limiting feature is slidingly coupled to the second jacket to allow translation of the collapse limiting feature.

5. The steering column assembly of claim 4, further comprising a spring in contact with the collapse limiting feature to bias the collapse limiting feature into the first jacket path.

6. The steering column assembly of claim 1, wherein the second, greater range of travel for the first jacket includes a fully stowed position of the first jacket, the fully stowed position of the first jacket defined by a flush arrangement of an end of the first jacket with an end of the second jacket.

7. The steering column assembly of claim 1, wherein the first jacket is operatively coupled to the telescope drive bracket, wherein the first jacket is mechanically decoupled from the telescope drive bracket during an energy absorption event to prevent the telescope drive bracket from engaging the cam portion of the collapse limiting feature to an extent necessary to move the blocking portion out of the first jacket path.

8. The steering column assembly of claim 1, wherein the cam portion is a ramp formed on the surface of the collapse limiting feature.

9. The steering column assembly of claim 1, wherein the blocking portion is a hook formed on the collapse limiting feature.

10. A steering column assembly comprising:
a first jacket;
a second jacket; and
a third jacket, wherein the first jacket and the third jacket are telescopingly moveable relative to each other and to the second jacket;
a collapse limiting feature having a cam portion and a blocking portion, wherein the blocking portion defines a first range of travel of the first jacket in a first position, wherein contact between the third jacket and the cam portion biases the blocking portion out of a first jacket path to allow a second, greater range of travel for the first jacket.

11. The steering column assembly of claim 10, wherein the collapse limiting feature is pivotably coupled to the second jacket.

12. The steering column assembly of claim 11, further comprising a torsion spring in contact with the collapse limiting feature to bias the collapse limiting feature into the first jacket path.

13. The steering column assembly of claim 10, wherein the collapse limiting feature is slidingly coupled to the second jacket to allow translation of the collapse limiting feature.

14. The steering column assembly of claim 13, further comprising a spring in contact with the collapse limiting feature to bias the collapse limiting feature into the first jacket path.

15. The steering column assembly of claim 10, wherein the second, greater range of travel for the first jacket includes a fully stowed position of the first jacket, the fully stowed position of the first jacket defined by a flush arrangement of an end of the first jacket with an end of the second jacket.

16. The steering column assembly of claim 10, wherein the first jacket is operatively coupled to the telescope drive bracket, wherein the first jacket is mechanically decoupled from the telescope drive bracket during an energy absorption event to prevent the telescope drive bracket from engaging the cam portion of the collapse limiting feature to an extent necessary to move the blocking portion out of the first jacket path.

17. The steering column assembly of claim 10, wherein the cam portion is a ramp formed on the surface of the collapse limiting feature.

18. The steering column assembly of claim 10, wherein the blocking portion is a hook formed on the collapse limiting feature.

* * * * *